United States Patent [19]

Hait

[11] Patent Number: 5,726,804

[45] Date of Patent: Mar. 10, 1998

[54] WAVETRAIN STABILIZATION AND SORTING

[75] Inventor: John N. Hait, Missoula, Mont.

[73] Assignee: Rocky Mountain Research Center, Missoula, Mont.

[21] Appl. No.: 442,329

[22] Filed: May 15, 1995

[51] Int. Cl.$^6$ .............................. G02B 27/10; H01S 3/10
[52] U.S. Cl. .............. 359/577; 359/558; 359/15; 359/618; 372/102
[58] Field of Search ..................... 359/577, 558, 359/15, 618; 372/18, 19, 26, 28, 102; 385/37

[56] References Cited

U.S. PATENT DOCUMENTS

| | | | |
|---|---|---|---|
| 4,655,547 | 4/1987 | Heritage et al. | 359/563 |
| 4,813,762 | 3/1989 | Leger et al. | 372/18 |
| 5,033,060 | 7/1991 | Leger et al. | 359/565 |
| 5,351,325 | 9/1994 | Miller et al. | 385/42 |
| 5,410,625 | 4/1995 | Jenkins et al. | 385/24 |
| 5,453,833 | 9/1995 | Kawashima et al. | 372/29 |
| 5,454,004 | 9/1995 | Leger | 372/99 |

*Primary Examiner*—Jon W. Henry
*Attorney, Agent, or Firm*—Leonard D. Schappert

[57] ABSTRACT

A means and method for phase stabilization and sorting of wavetrains of electromagnetic energy comprising: splitting an input beam into a plurality of intermediate beams; directing the intermediate beams along separate delay paths so that wavetrains from the delayed beams overlap each other and bridge gaps between wavetrains; producing interference with the delayed beams at a plurality of locations at an image component separator, and separating energy at each location, phase-adjusting and directing it into at least one output, thereby providing a wavetrain phase stabilizer having a substantially constant phase output by phase-matching overlapping wavetrains. Multiple outputs may be added to facilitate wavetrain sorting. Inserting the invention into the feedback path of a laser provides phase-stabilized continuous-wave laser light.

9 Claims, 4 Drawing Sheets

WAVETRAIN STABILIZATION AND SORTING

BACKGROUND OF THE INVENTION

1. Technical Field

The present invention relates to the phase stabilization of electromagnetic wavetrains and to wavetrain sorting. The invention can be utilized both inside and outside of laser cavities.

2. Background Art

The background art consists of various applications of two similar implementations of basic optical wavetrain physics. The oldest method is the Fabry-Perot etalon that has been in use since the nineteenth century, and the more recent Narrow Band Mach-Zender Filter, U.S. Pat. No. 5,351,325, by Miller et al. While both methods narrow the bandwidth, neither provides a continuous phase-stable output sufficient for powering interference-based optical computers.

While the optical arrangements of the background art are different, their principles of operation are quite similar. Basically, a wide-band input beam is split into two or more portions, each portion undergoes a delay, and the delayed portions are then reunited to produce a narrow-band (but not phase-stabilized) output. Miller et al uses optical fibers as waveguides for introducing a different delay into each of the different portions. The portions are then combined using an optical fiber coupler. The purpose of the coupler is to combine wavetrains having various phase delays into a single fiber output.

The etalon also separates the light input into a number of portions by means of multiple partial reflections between the two reflecting surfaces of the etalon. However, unlike Miller et al, the etalon combines the multiple delayed signals using multi-beam interference, resulting in a number of maxima that individually have a common phase, but as a group have different phases, producing a fluctuating phase output. As a result, neither of these methods provides a phase-stabilized output.

SUMMARY OF THE INVENTION

The present invention is a means and method for phase-stabilizing wavetrains of electromagnetic energy comprising the following steps:

1. providing an input beam having of a series of wavetrains of electromagnetic energy of at least one wavelength;
2. splitting said input beam into a plurality of intermediate beams;
3. directing each of said plurality of intermediate beams along a separate delay path to produce a separate delay for each of said plurality of intermediate beams which produces a plurality of delayed wavetrains that continuously overlap each other;
4. producing interference with said plurality of delayed beams at a plurality of locations, and
5. separating, phase-adjusting and directing energy from each of said plurality of locations into at least one output, said phase-adjusting being done so that energy from said plurality of locations arrives at said at least one output having a substantially constant phase, thereby providing a wavetrain phase stabilizer having a substantially constant phase output by phase-matching overlapping wavetrains.

Step 3 is a departure from the prior art in that the delay induced in the intermediate beams is specifically timed so as to produce time-overlapping wavetrains wherein wavetrain positions are such that the gap which normally occurs between successive wavetrains is bridged by the overlapping wavetrains so that a continuous supply of energy is provided for the next step.

Step 4 uses interference for the special purpose of combining the intermediate beams in such a way that all possible combinations of the intermediate beams are combined using constructive interference, so that the energy from each of the beams that may be on at any one instant is always in phase with other beams at the various locations throughout the interference image. This is an improvement over the multiple-beam interference of the etalon because the interference image produced is specifically spread over the surface of an image component separator so that the individual phase positions of the many locations within the image can be utilized, whereas the typical etalon output is directed through a lens without further processing, bringing uncoordinated multiple-phase energy together and introducing unwanted phase modulation into the output. It is also an improvement over Miller et al who combines the phase changing beams without the use of an interference image for separating the various phase signals.

Step 5 separates energy from the individual locations within the interference image so that energy arriving at each location can be processed separately by specifically engineered optics. Energy is directed from the separate locations within the interference image into a common output. Unlike the prior art, however, the present invention includes phase shifters so that the energy which is separated from each location within the image will arrive at the output location having the same phase as energy that arrives at the output from any of the other locations within the image.

This additional processing is needed because, at any given instant, only a portion of the interference image is actually at full maximum. That instantaneous maximum position changes randomly as the phase of the input wavetrains fluctuates. If energy from the image is combined without phase correction, as with the prior art, the result is a phase-modulated conglomerate. In the present invention, however, the energy from each location within the image is phase-corrected, thereby combining energy from throughout the interference image into a single constant phase-stabilized output.

The present invention has the additional advantage of being implementable without the need of optical fibers or etalons, but that is not to say that they cannot be used. Both conventional optical elements and holograms can be used for each of the components. Wavetrain delay can be implemented with free space routing or any combination of optical elements, including optical fibers. Further, if the basic wavetrain stabilizer is inserted into the optical feedback path of a laser, a narrow-band, phase-stabilized, continuous-wave output can be achieved.

The present invention can operate with electromagnetic energy of any wavelength in the electromagnetic spectrum. In fact, through the use of carefully selected multiple frequencies and optics, a plurality of phase-stabilized wavetrains can be produced in a single output.

Interference also separates energy by wavelength as well as by phase. As a result, the directing and phase-shifting steps 6 and 7 can just as easily direct and phase-adjust energy of different wavelengths into different outputs as it can into a common output. When two or more wavelengths are directed into a common output, the result is multiple-frequency phase-stabilized wavetrains. When energy of different wavelengths is directed into separate outputs, the result is wavetrain sorting where phase-stabilized wavetrains of different wavelengths are sorted into separate outputs.

One of the objects of the present invention is to provide a basic method and means (apparatus) for phase-stabilizing a beam of electromagnetic energy.

Another object of the present invention is to provide a narrow-band optical output from a wide-band input.

A further object of the present invention is to provide a phase stabilizer that can be inserted in the optical feedback path of a laser so as to provide a continuous-wave output without rapid phase changes or spaces between wavetrains.

Another object of the present invention is to provide a means and method for sorting wavetrains.

The foregoing summary, objects, and benefits of the present invention will become clearer through an examination of the drawings, description of the drawings, description of the preferred embodiment, and claims which follow.

Please note that the beam angles, sizes, and proportions are exaggerated so as to provide for clarity of understanding.

DESCRIPTION OF THE PREFERRED EMBODIMENT

Figure 1:
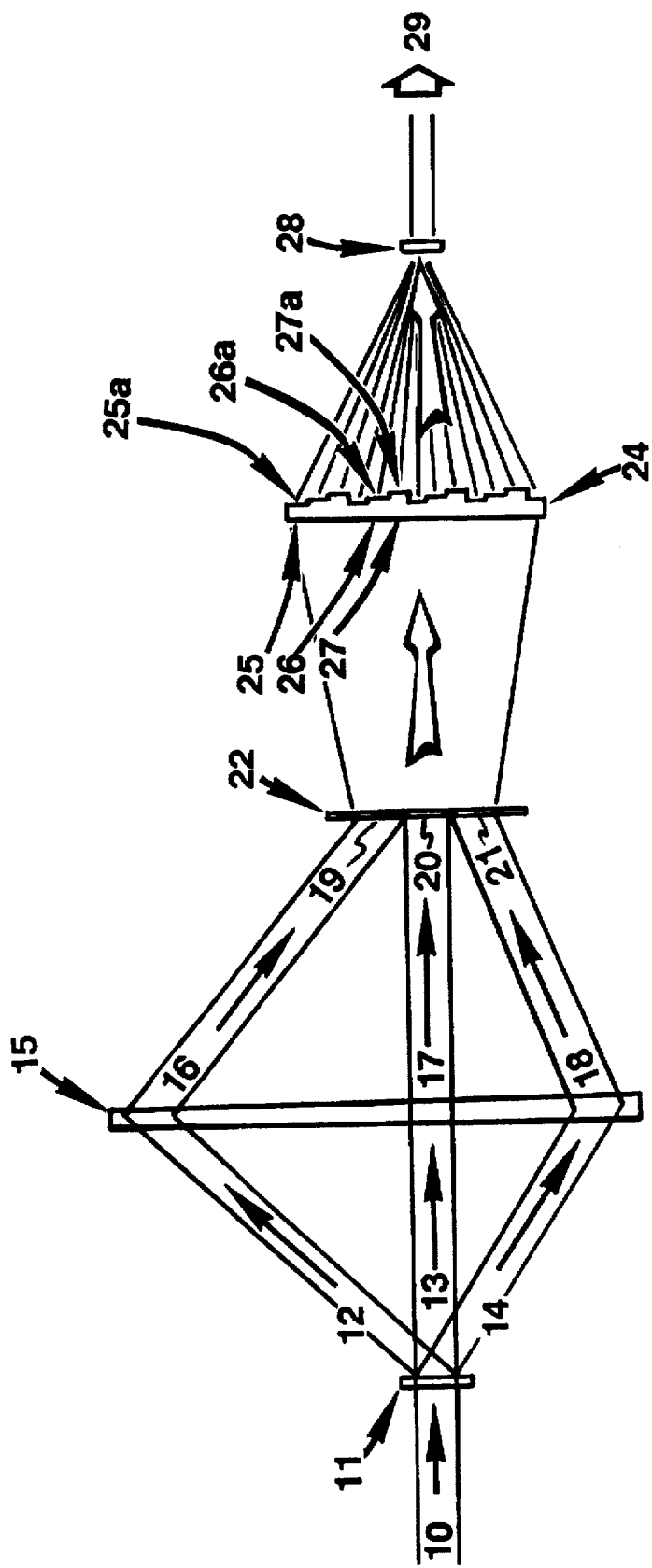
FIG. 1 is an operational view showing the arrangement of a phase stabilizer of the present invention.

FIG. 1 depicts the preferred embodiment of the wavetrain phase stabilizer. An input beam (10), having of a series of wavetrains of electromagnetic energy of at least one wavelength, is split using optical element (11) into a plurality of intermediate beams (12), (13), and (14). Optical element (15) helps direct the intermediate beams (12), (13), and (14) along separate delay paths (16), (17), and (18). This produces a separate delay for each of the intermediate beams (12), (13), and (14), producing the delayed beams at locations (19), (20), and (21).

Optical Element (22) combines the delayed beams at locations (19), (20), and (21) to produce an interference image at composite optical element (24), which acts as an image component separator. Three of the many locations within the interference image are (25), (26), and (27). Energy from the image is then phase-shifted by optical phase-shifting elements (25a), (26a), and (27a) and directed toward optical element (28). Phase shifting is done in order to match the path differences between composite optical element (24) and optical element (28) in such a way that energy from the many locations within the interference image arrives at optical element (28) having the same phase. Optical element (28) directs the phase-stabilized energy to provide output (29).

Figure 2:
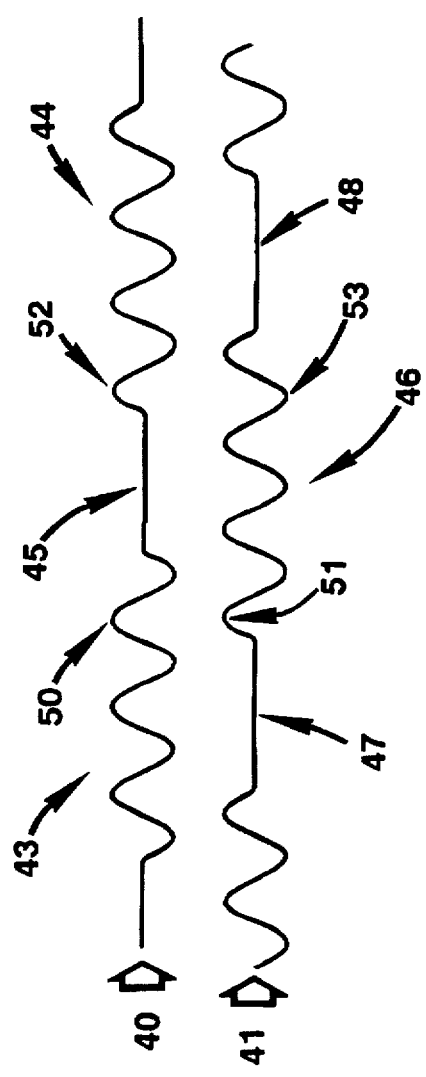
FIG. 2. shows wavetrain graphs which illustrate the operation of the present invention.
Figure 2:
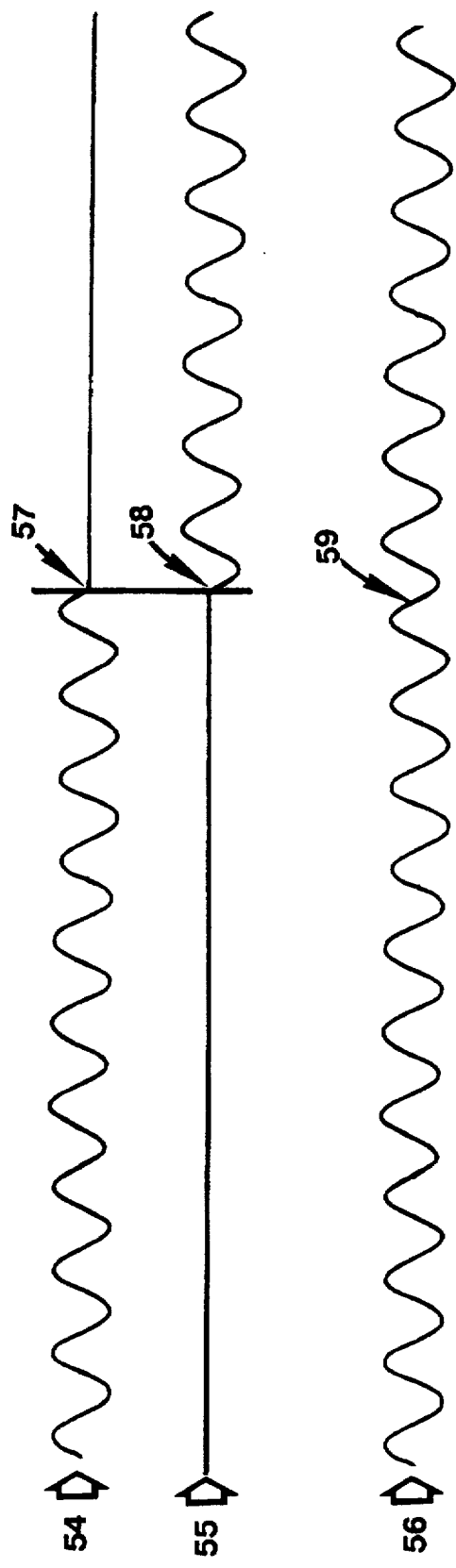

FIG. 2 depicts wavetrain graphs that show how the optical elements in FIG. 1 are arranged to accomplish wavetrain stabilization.

In the first stage of the present invention, wavetrain series (40) is a typical energy input having a series of wavetrains (43) and (44) that may not be in phase with each other, separated by a space (45). If such an input comes from a laser, the individual wavetrains tend to be several inches long, representing the coherence length of the laser. If some other source is used, the wavetrains may be much shorter. The present invention has the advantage that the geometry of its optics can be designed to work with either short or long wavetrains. For purposes of this discussion, wavetrain series (40) will be considered to be input (10).

Optical elements (11) and (15) separate and direct energy from input (10) so as to provide a plurality of delay paths of different lengths such as delay path (16), which goes from optical element (10) through optical element (15) to location (19), delay path (17), which goes from optical element (10) through optical element (15) to location (20), and delay path (18), which goes from optical element (10) through optical element (15) to location (21).

Energy from all of the separated paths arrives at optical element (22) having undergone different delay periods. Wavetrain series (40) and (41) can now be used to depict the relationship between any two of the delayed beams when they reach optical element (22), such as the delayed beam which arrives at location at (20) and wavetrain series (40) for one delayed wavetrain series, along with the delayed beam that arrives at location (21) and wavetrain series (41) for the second delayed wavetrain series.

The delay that wavetrain series (41) has undergone has been engineered by establishing the relative path differences so as to establish an important relationship between individual wavetrains such as wavetrains (43), (44), and (46). As a result, wavetrain (46) bridges space (45) by overlapping wavetrains (43) and (44). It should be noted that wavetrains such as (43) and (44) can arrive at optical element (22) from different delay paths such as delay paths (16) and (17), but are shown here to be coming from the same path because that occurs also, and it fits this step-by-step description.

The importance of overlapping the wavetrains is that it fills in any spaces that would otherwise appear in the output and provides continuity of energy for making continuous phase adjustments in the next stage. Without a continuous supply of wavetrains to the next stage, spaces occur between stabilized output wavetrains and a continuous wave output is not maintained.

Since the nineteenth century, etalons and mirrors have been used as wavetrain filters, as in this first stage. One problem with their operation has been that, after having produced a number of delay paths, the energy was recombined without regard to the phase relationships that had been established through multiple-beam interference. The light from all of the paths was focused directly into a single output without phase corrections. With light from all of the paths being indiscriminately superimposed in the output, the fluctuating phase relationships produced continuous phase and amplitude fluctuations in the output.

The only way to provide a phase-stabilized output is to first produce interference with the various delayed beams, and then to separate and phase-adjust each portion of the interference image. That is why the present invention is a three-stage process.

In the second stage, an interference image is produced by beam-combining using optical element (22). Holograms, lenses, mirrors, an etalon, or any other optical element arrangement capable of superimposing the various delayed beams from (12), (13), and (14) onto the left side of optical element (24) can be used as optical element (22).

Rather than simply piling all of the energy indiscriminately onto one location as in the prior art, the process of interference in the present invention produces a maxima of a constant phase at individual locations within the interference image such as locations (25), (26), and (27). By producing constructive interference first between wavetrain (43) and wavetrain (46), the two wavetrain series (40) and (41) are brought together at location (25). Constructive interference always occurs at a location where two or more rays are in phase. So in this case, positions (50) and (51) of wavetrains (43) and (46) initially from beams (13) and (14) are in phase at location (25).

Whenever the majority of the energy coming from optical element (22) is in phase with wavetrains (43) and (46), energy at location (25) will be a maxima. Whether or not energy at location (25) is a maxima, because of interference, the optical arrangement produced geometry of the interfering energy flow from optical element (22) to composite optical element (24) is such that the relative phase at location (25) will be substantially constant, even though the amplitude at that point changes as the phase of the input wavetrains changes.

Such relationships exist between all points on optical element (22) and all of the points on the left side of composite optical element (24), such as locations (25), (26), and (27). As a result, when the majority of the energy from optical element (22) phase-matches at location (25), then the maxima will be at location (25). A different set of wavetrains will have a different phase relationship which will phase-match at location (26); this is also true for location (27). Thus, as the relative phase relationships change among the many wavetrains, so will the instantaneous position of the maxima.

For most observers, the interference image simply appears to be a stable image that always looks the same. That is because the phase changes that occur are much faster than the response time of the human eye so that they usually go unnoticed. Nevertheless, the instantaneous position of the maxima moves around within the image in accordance with the instantaneous phase relationships of the input.

Looking back again at a specific wavetrain relationship, at location (25) a much longer wavetrain (54) is produced by the interference. It is made by bringing together wavetrains (43) and (46).

Please note that in the graph in FIG. 2, wavetrain series (40) is aligned vertically with wavetrain series (41), but is not aligned vertically with wavetrain (54). Wavetrains (54), (55), and (56) are aligned vertically among themselves only. This is because wavetrain series (40) and (41) are at location (22), while wavetrains (54) through (56) occur at composite optical element (24) and optical element (28).

When wavetrain (43) terminates during space (45), the amplitude at location (25) will be reduced, while the amplitude of the other positions within the interference image will be increased. Because of the law of conservation of energy, this will have no overall effect on phase-stabilizing the output because the phase at location (25) and other locations within the interference image are unaffected, as is the operation of the invention. Therefore amplitude fluctuations are not shown.

After space (45) is bridged, interference occurs between wavetrains (46) and (44). However, they, do not have the same phase relationship as did wavetrains (43) and (46), as shown by positions (52) and (53). As a result, the position where a constructive interference maxima occurs at location (26) is different than before. This transition of the maxima from one location within the interference image to another is shown as positions (57) and (58).

So, as the phase relationships among the delayed beams change, the maxima moves from place to place within the image. While the relative phases at locations (25), (26), and (27) remain constant, those places are not in phase with each other. This result from using an interference image is an important fact of physics that the present invention uses to full advantage.

The first stage of the present invention produces overlapping wavetrains. The second stage uses interference to combine wavetrains into a set of longer wavetrains that are spread among the many locations within the interference image. The third stage phase adjusts and directs energy from these many image locations into a common output.

Energy from each part of the interference image needs to be phase-adjusted as it is brought together from the various parts of the image into a common output. To accomplish this phase adjustment and to direct energy to optical element (28), composite optical element (24) contains a large number of optical phase-shifting elements such as (25a); (26a), and (27a). Energy from each part of the interference image is individually phase-adjusted so that, when it arrives at optical element (28), it all has the same phase. This products a continuous phase-stabilized wavetrain (56) by combining wavetrains (54) and (55) at location (28). Because wavetrains (54) and (55) have been phase-adjusted, the transition at positions (57) and (58) is completely smooth and in phase at position (59).

A close-up view shows that the energy at location (25), whenever it is available, wavetrain (54), is separated from the rest of the interference image by the positioning and locating of optical phase-shifting element (25a). Optical phase-shifting element (25a) phase-shifts as it directs energy on to optical element (28). When energy at location (26) is available, wavetrain (55), it is separated, phase-adjusted, and directed to location (28) by optical phase-shifting element (26a).

Optical phase-shifting elements (25a), (26a), and (27a) can be either an individual set of optical elements that make up the composite optical element (24), or pixels within a phase hologram to be utilized as composite optical element (24). Any convenient optical means may be used that accomplishes three basic tasks at each pixel position within the interference image. Those three tasks are to 1. separate energy from each pixel position, 2. phase-shift the energy, and 3. direct it so that it arrives at optical element (28) having a substantially constant phase. Composite optical element (24) performs all three functions as an image component separator. The same three simultaneous tasks are accomplished at each of the pixel locations with the interference image by optical phase-shifting elements such as (25a), (26a), and (27a).

By constructing the image component separator means, directing means, and the phase adjusting means as a composite optical element (24), the phase stability is ensured. This is accomplished by maintaining the integrity of the physical relationships between the image component separator means, the directing means, and the phase adjusting means at each pixel location. This is especially important at optical wavelengths, because the wavelengths are so small and temperature changes and/or stresses undergone by separate components tend to alter the phase relationships needed to produce phase stabilization.

The present invention uses this multistage process where wavetrains are separated, delayed, and subjected to interference to sort out the phase relationships, then separated, phase-adjusted, and combined to produce phase-stabilized output.

Additionally, if the space (45) between wavetrains (43) and (44) is much larger than the delay times, the output will be a series of stabilized wavetrains interrupted by the long space. Each long wavetrain is phase-stabilized, but lacking a constant input, the phase relationships between those long wavetrains may not be constant. This occurs when the input signal has been amplitude-modulated with digital information. As a result, the digital information feeds through, but not the phase information. If, however, the digital information is not 100% modulated, or is mixed with a continuous wave carrier of the same frequency, the digital information will pass through while maintaining phase stabilization because of the continuity of input energy.

Figure 3:
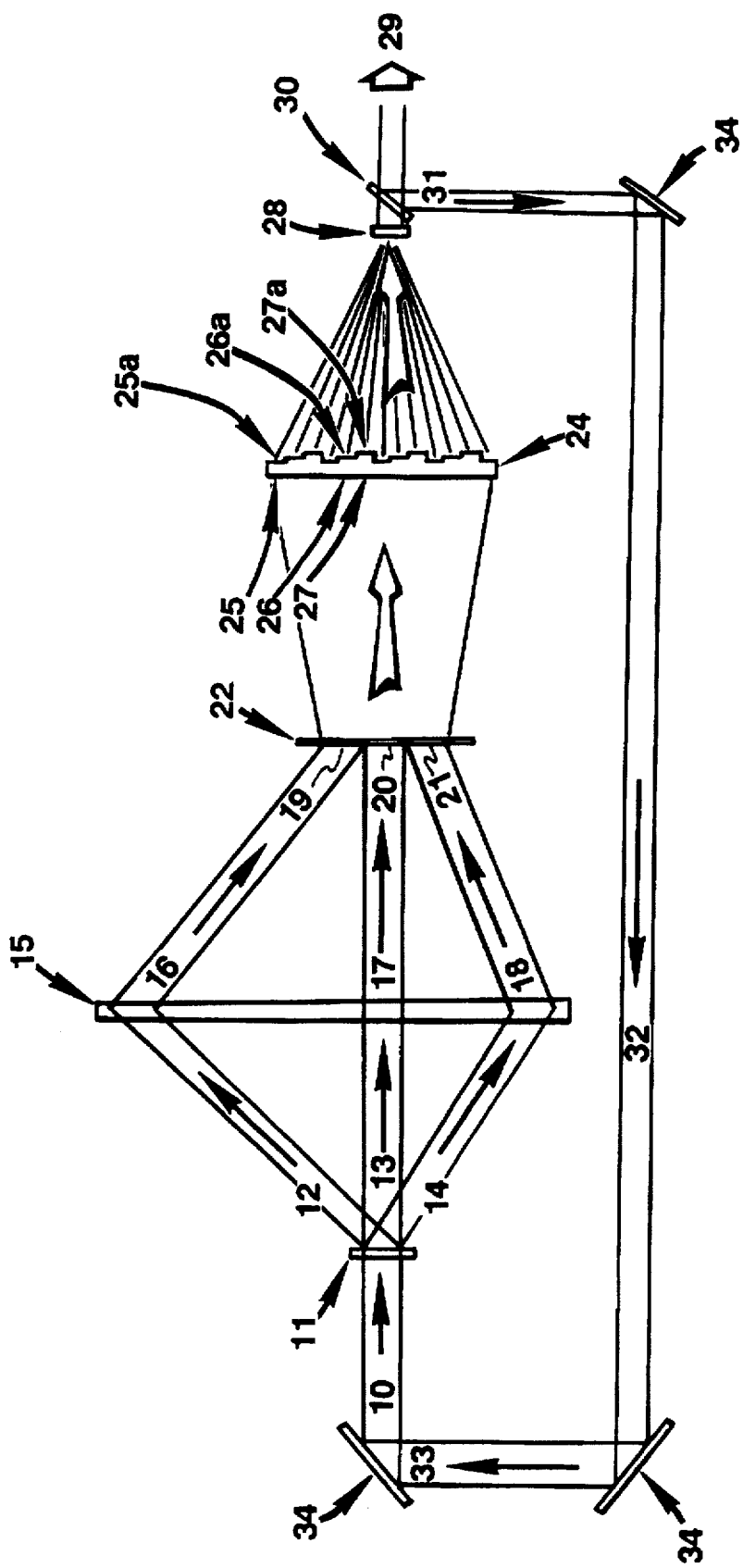
FIG. 3. shows the phase stabilizer of FIG. 1 inserted into the feedback path of a laser.

FIG. 3 depicts the insertion of the entire wavetrain stabilizer of FIG. 1 into the optical feedback path shown as (31), (32), (33), and (10) of a laser. Here, a portion of output (29) is directed back to input (10) by optical elements (30), a beam splitter, and mirrors (34). All or a portion of FIG. 3 includes a lasing medium in the optical paths, along with the typical laser powering apparatus (not shown.) The result is that the laser light at output (29) is a phase-stabilized continuous-wave signal of sufficient quality to operate interference-based optical computers and other photonic transistor devices.

Whether inside a laser or not, a typical embodiment of the present invention may use a large number of different delay paths so that a variety of wavetrain lengths and spaces between wavetrains can be accommodated. Interference of energy from multiple delay paths such as (16), (17), and (18) also tends to narrow the bandwidth of the overall arrangement, as multiple-beam interference usually does. However, the energy from the interference image at optical phase-shifting elements such as (25a), (26a), and (27a) also provides another important feature of the present invention that is absent from the prior art; to wit, wavetrain sorting.

Interference separates energy by more than just phase; it also separates by frequency. That is, if input beam (10) contains multiple wavelengths, the subset of locations within the interference image used by one wavelength will be a different subset from those locations used by another wavelength. For that reason, optical phase-shifting elements (25a), (26a), and (27a) are engineered so as to provide a constant output phase for each of the wavelengths to be combined at optical element (28).

However, there may be energy within input beam (10) that we do not want to become a part of output (29). Energy from those locations is simply not directed toward optical element (28), but is directed elsewhere or is absorbed. As a result, it does not become a part of output (29). The same is true of locations within the interference image that are common to two or more wavelengths, but cannot be properly phase-adjusted by a single element such as optical phase-shifting element (27a). In this case, the energy can also be directed elsewhere so that energy from that location will not adversely affect the individual wavelengths present in output (29). It can even be recycled by means of feedback into input beam (10) as shown in FIG. 3.

Figure 4:
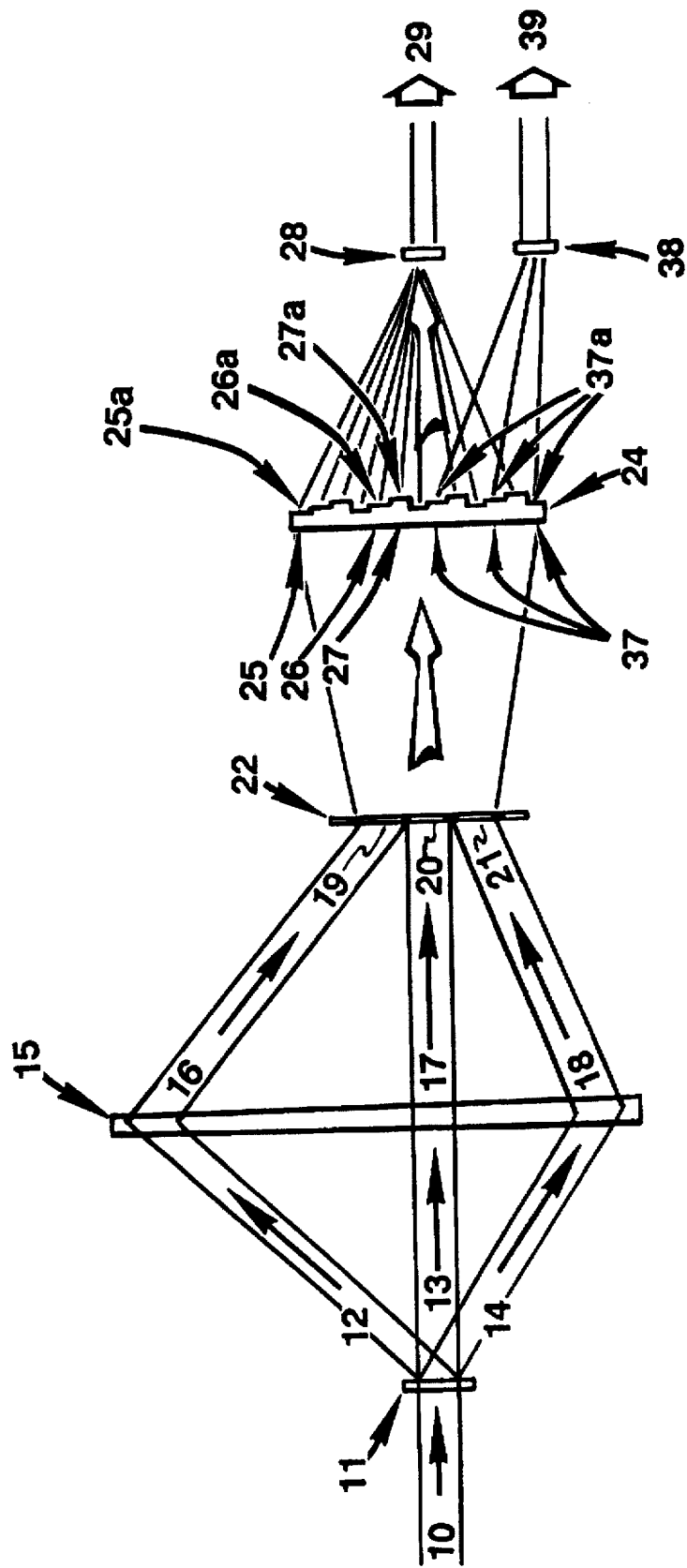
FIG. 4. shows how the phase stabilizer of the present invention can be used with wavetrain sorting.

FIG. 4 shows how certain locations (37) within the interference image can be directed by optical phase-shifting elements (37a) and optical element (38) to provide one or more additional outputs (39). Operation is the same as with output (29), except that energy from locations (37) is directed to optical element (38) instead of (28). The result is that wavetrains are able to be sorted and separated to provide phase-stabilized outputs of different wavelengths.

While the foregoing description of the preferred embodiment of the present invention has disclosed specific constructions, means, and methods of accomplishing the present invention, because specific improvements and modifications will become readily apparent to those skilled in the art of computers, optical devices, and the like, it is applicant's intent not to be limited by any of the foregoing descriptions, but only by the claims which follow.

What is claimed is:

1. A method of phase-stabilizing wavetrains of electromagnetic energy comprising the following steps:

providing an input beam having a series of wavetrains of electromagnetic energy of at least one wavelength;

splitting said input beam into a plurality of intermediate beams;

directing each of said plurality of intermediate beams along a separate delay path to produce a separate delay for each of said plurality of intermediate beams which produces a plurality of delayed wavetrains that continuously overlap each other;

producing interference with said plurality of delayed wavetrains at a plurality of locations, and separating, phase-adjusting and directing energy from each of said plurality of locations into at least one output, said phase-adjusting being such that energy from said plurality of locations arrives at said at least one output having a substantially constant phase, thereby providing a wavetrain phase stabilizer having a substantially constant phase output by phase-matching overlapping wavetrains.

2. The invention of claim 1 including:

positioning said wavetrain phase stabilizer in the optical feedback path of a laser, thereby producing laser action having a phase-stabilized narrow-band output.

3. The invention of claim 1: wherein:

said input beam has at least one other wavelength, and including:

directing said energy of said at least one other wavelength from a subset of said plurality of locations into at least one other output, thereby providing wavetrain sorting by directing energy of said at least one wavelength into said at least one output, and energy of said at least one other wavelength into said at least one other output.

4. A wavetrain phase stabilizer for phase-stabilizing wavetrains of electromagnetic energy comprising:

in input beam having a series of wavetrains of electromagnetic energy of at least one wavelength;

a beam-splitting optical element for splitting said input beam into a plurality of intermediate beams;

first directing means for directing each of said plurality of intermediate beams along a separate delay path to produce a separate delay for each of said plurality of intermediate beams which produces a plurality of delayed wavetrains that continuously overlap each other, said first directing means being structured, positioned, and oriented so as to produce interference with said plurality of delayed wavetrains at a plurality of locations;

at least one output;

image component separator means positioned at said plurality of locations; second directing means for directing energy from said plurality of locations to said at least one output, and phase adjusting means for phase adjusting said energy from each of said plurality of locations so that said energy arrives at said at least one output having a substantially constant phase, thereby providing an output having a substantially constant phase by phase-matching overlapping wavetrains.

5. The invention of claim 4 wherein:

said wavetrain phase stabilizer is positioned in the optical feedback path of a laser, thereby producing laser action having a phase-stabilized narrow-band output.

6. The invention of claim 4: wherein:

said input beam has at least one other wavelength, and including:

third directing means for directing said energy of said at least one other wavelength from a subset of said plurality of locations into at least one other output, thereby providing wavetrain sorting by directing energy of said at least one wavelength into said at least one output, and energy of said at least one other wavelength into said at least one other output.

7. The invention of claim 4 wherein:

said image component separator means, said second directing means, and said phase adjusting means are constructed as a composite optical element thereby ensuring phase stability by maintaining the integrity of physical relationships between said image component separator means, said second directing means, and said phase adjusting means.

8. The invention of claim 7 wherein:

said wavetrain phase stabilizer is positioned in the optical feedback path of a laser, thereby producing laser action having a phase-stabilized narrow-band output.

9. The invention of claim 7: wherein:

said input beam has at least one other wavelength, and including:

third directing means for directing said energy of said at least one other wavelength from a subset of said plurality of locations into at least one other output, thereby providing wavetrain sorting by directing energy of said at least one wavelength into said at least one output, and energy of said at least one other wavelength into said at least one other output.

* * * * *